(12) United States Patent
Lipton

(10) Patent No.: US 6,728,754 B1
(45) Date of Patent: Apr. 27, 2004

(54) METHOD, SYSTEM, AND ARTICLE FOR TELEPHONE NOTIFICATION OF AN ONLINE STATUS OF A USER

(75) Inventor: Marc Ira Lipton, Lincolnshire, IL (US)

(73) Assignee: SBC Properties, LP, Reno, NV (US)

( * ) Notice: Subject to any disclaimer, the term of this patent is extended or adjusted under 35 U.S.C. 154(b) by 0 days.

(21) Appl. No.: 09/567,838

(22) Filed: May 9, 2000

(51) Int. Cl.[7] .............................................. G06F 15/16
(52) U.S. Cl. .................. 709/203; 370/352; 379/201.01; 379/90.01; 713/200; 709/318; 709/223; 709/224
(58) Field of Search ................................ 709/223, 224, 709/203, 318, 206–207; 379/22.04, 201.01, 90.01, 88.13; 713/200, 201

(56) References Cited

U.S. PATENT DOCUMENTS

| 5,751,791 A | * 5/1998 | Chen et al. ..................... 379/88 |
| 5,943,478 A | 8/1999 | Aggarwal et al. .......... 713/201 |
| 6,301,609 B1 | * 10/2001 | Aravamudan et al. ...... 709/207 |

* cited by examiner

Primary Examiner—Jack B. Harvey
Assistant Examiner—Hien C. Le
(74) Attorney, Agent, or Firm—Brinks Hofer Gilson & Lione

(57) ABSTRACT

One or more members of a group are notified of an online status of a user. If a member of the group is off-line and has enabled a telephone notification option, a telephone message indicating the online status of the user is sent to the member. If the member of the group is online, an online message indicating the online status of the user is sent to the member.

23 Claims, 2 Drawing Sheets

METHOD, SYSTEM, AND ARTICLE FOR TELEPHONE NOTIFICATION OF AN ONLINE STATUS OF A USER

TECHNICAL FIELD

The present invention relates to methods, systems, and articles for notifying of an online status of a computer user.

BACKGROUND OF THE INVENTION

At the present time, instant messaging Internet products, such as those made available by America Online and Microsoft Corporation, notify subscribers already online as to when members of their buddy list have arrived online. A shortcoming of these products is that off-line subscribers are not notified of the online status of other members.

An example of a system for immediate pop-up messaging across the Internet is disclosed in U.S. Pat. No. 5,943,478 to Aggarwal et al. This patent also discloses a method and infrastructure for continuously tracking and reporting the online status of users.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DETAILED DESCRIPTION OF A PREFERRED EMBODIMENT

Embodiments of the present invention beneficially place one or more telephone calls to notify off-line members of a buddy list that a user has gone on-line. Each member has an option of enabling and disabling notification telephone calls to be placed to him/her. Further, each member has an option of enabling and disabling the feature of notifying other members of his/her online status. Optionally, a number of notification telephone calls placed to a member may be limited during a time duration. As another option, a member may choose to receive notification telephone call for only certain members in a subset of the buddy list. As a further option, a member may place a telephone call to an interactive voice response (IVR) unit having a storage device which stores the notifications. Within the telephone call, the IVR provides a message indicating which members of the buddy list are on-line.

Figure 1:
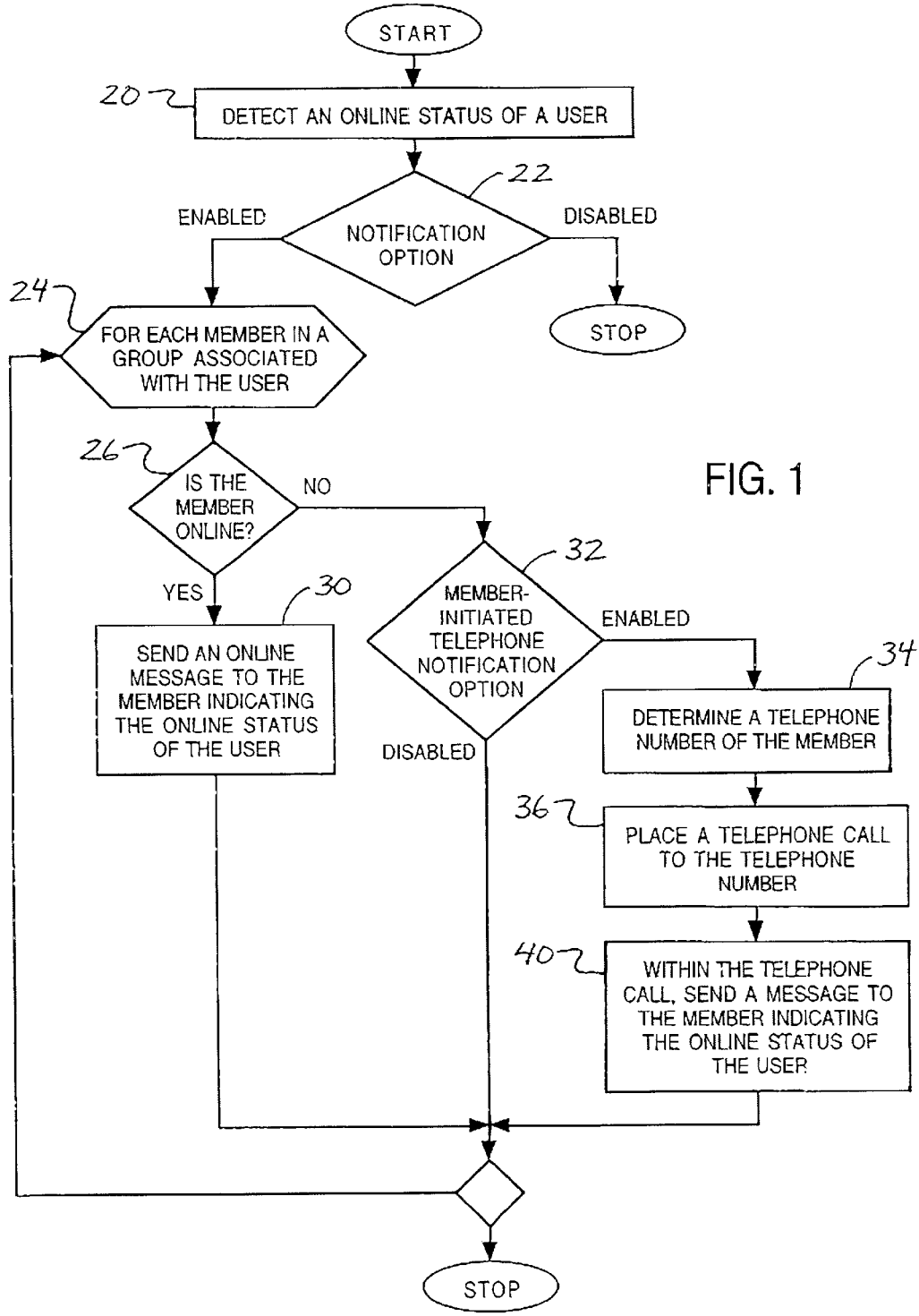
FIG. 1 is a flow chart of an embodiment of method of notifying of an online status of a user.

FIG. 1 is a flow chart of an embodiment of method of notifying of an online status of a user. As indicated by block 20, the method comprises detecting an online status of a user. The online status of the user may be detected by an a computer network service provider, such as an Internet service provider, which serves the user. Alternatively, the online status of the user may be detected by a node of a computer network, such as a server accessible via the Internet. In this case, for example, the user's computer may communicate a message to the node via the computer network, where the message indicates that the user has gone online. The message may be communicated automatically upon the user going online. U.S. Pat. No. 5,843,478 to Aggarwal et al., which discloses an infrastructure and method for tracking the online status of users, is hereby incorporated by reference into this disclosure.

As indicated by block 22, the method comprises determining if a user-initiated notification option is enabled. The user-initiated notification option dictates whether or not other users are to be notified of the online status of the user. The user-initiated notification option may be enabled or disabled by the user either before or after the user has gone online. The user-initiated notification option may be selected using the user's computer, and communicated in a message to either the aforementioned computer network service provider or the node.

If the user-initiated notification option is enabled, a routine is performed for each member in a group associated with the user, as indicated by block 24. The group, which may be referred to as a "buddy list", typically comprises one or more other users with which the user communicates via the computer network. The users may communicate via an instant messaging platform, an example of which is disclosed in U.S. Pat. No. 5,843,478 to Aggarwal et al., which is incorporated by reference into this disclosure. Other messaging platforms, such as electronic mail, are also within the scope of this disclosure.

As indicated by block 26, the routine comprises determining if the member is online. If the member is online, an act of sending an online message to the member is performed, as indicated by block 30. The online message indicates the online status of the user.

If the member is off-line, an act of determining if a member-initiated telephone notification option is enabled is performed, as indicated by block 32. The member-initiated telephone notification option dictates whether or not the member wishes to be notified by telephone of the online status of any user. The member may enable or disable the member-initiated notification option using his/her computer. The computer, in turn, communicates a message based on the option to either the computer network service provider or the node. Typically, the member either enables or disables the member-initiated notification option prior to the user going online.

If the member-initiated telephone notification option is enabled, an act of determining a telephone number associated with the member is performed as indicated by block 34. Typically, this act comprises retrieving the telephone number from a database. As indicated by block 36, a telephone call is placed to the telephone number. As indicated by block 40, a message is sent within the telephone call. The message indicates the online status of the user to the member. Preferably, the message includes an audio message comprising either a pre-recorded spoken message, a synthesized speech message, or a combination thereof which indicates the online status of the user.

Optionally, a number of notification telephone calls placed to a member may be limited during a time duration. For example, each member may be limited to receiving no more than a predetermined number of notification telephone calls within a day, or another predetermined number of notification telephone calls within an hour. In this case, if the member has reached the limit of notification telephone calls, the acts indicated by blocks 34, 36 and 40 are not performed, thus inhibiting placing the telephone call to the telephone number associated with the member.

As another option, a member may choose to receive notification telephone call for only certain members in a subset of the buddy list. In this case, if the user is not included in the subset, the acts indicated by blocks 34, 36 and 40 are not performed, thus inhibiting placing the telephone call to the telephone number associated with the member. The member may select the subset of the buddy list using his/her computer. The computer, in turn, communicates a message based on the selection to either the computer network service provider or the node. Typically, the member selects the subset of the buddy list prior to the user going online.

Referring back to block 32, if the member-initiated telephone notification option is disabled, the method inhibits placing a telephone call to a telephone number associated with the member. From blocks 30, 32 and 40, the aforementioned routine is repeated for any additional members in the group.

Based upon the herein-disclosed high-level description, one or more computer programs to direct one or more computers to perform the method is within the skill of a routineer in the art of telecommunications.

Embodiments of the herein-disclosed method may be directed by computer-readable instructions encoded on a computer-readable medium. The contents of the computer-readable medium cause at least one computer to perform the herein-disclosed acts. For this purpose, at least one computer processor is responsive to the contents of the computer-readable medium.

Examples of the computer-readable medium include, but are not limited to, a computer-readable storage medium and a computer-readable communication medium. Examples of a computer-readable storage medium include, but are not limited to, an optical storage medium, an electronic storage medium, and a magnetic storage medium. The computer-readable storage medium may include stored data which encode computer program code and/or other computer-readable instructions.

Examples of a computer-readable communication medium include, but are not limited to, an optical communication medium, an electronic communication medium, and an electromagnetic communication medium. The contents of the computer-readable communication medium may include one or more waveforms which encode computer data such as computer program code and/or other computer-readable instructions.

Figure 2:
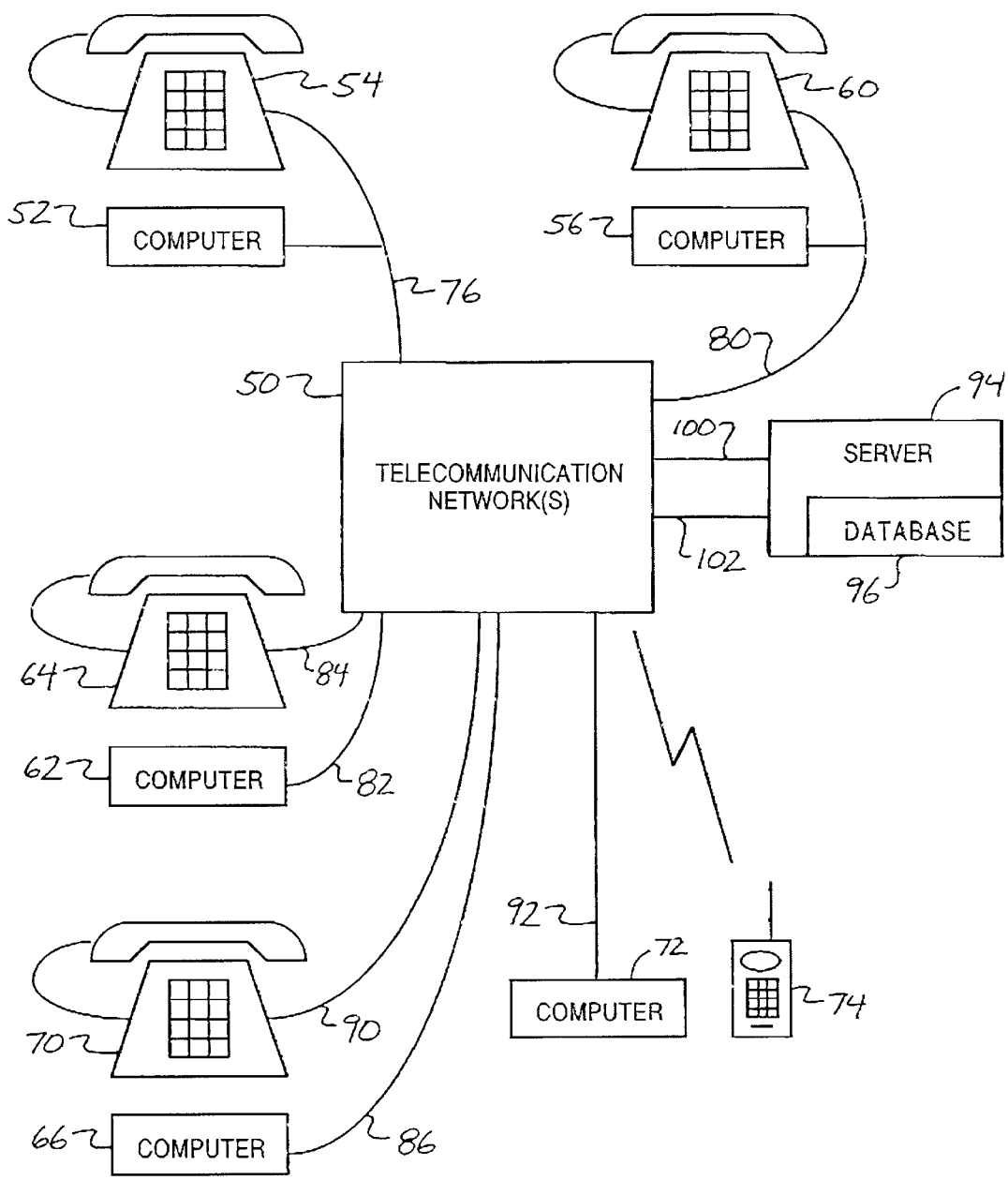
FIG. 2 is a schematic/block diagram of an embodiment of a system for notifying of an online status of a user.

FIG. 2 is a schematic, block diagram of an embodiment of a system for notifying of an online status of a user. The system comprises one or more telecommunication networks 50 which provide computer network access and telephone service to a plurality of users. For example, the one or more telecommunication networks 50 may comprise either a public switched telephone network, a private telephone network, digital subscriber line access to a computer network, cable-television-based access to a computer network, satellite-based access to a computer network, or any combination thereof.

For purposes of illustration and example, FIG. 2 shows a computer 52 and a telephone 54 associated with a first user, a computer 56 and a telephone 60 associated with a second user, a computer 62 and a telephone 64 associated with a third user, a computer 66 and a telephone 70 associated with a fourth user, and a computer 72 and a telephone 74 associated with a fifth user.

The computer 52 has a dial-out modem to access an Internet service provider via a telephone line 76. The telephone line 76 is also used to provide telephone service using the telephone 54.

The computer 56 has a dial-out modem to access an Internet service provider via a telephone line 80. The telephone line 80 is also used to provide telephone service using the telephone 60.

The computer 62 has a dial-out modem to access an Internet service provider via a first telephone line 82. A second telephone line 84 is used to provide telephone service using the telephone 64.

The computer 66 has a cable modem to access an Internet service provider via a cable line 86. A telephone line 90 is used to provide telephone service using the telephone 70.

The computer 72 has a network interface to access an Internet service provider via a digital subscriber line 92. The telephone 74 comprises a radiotelephone having telephone service provided thereto by a mobile telephone switching office.

A server 94 accessible via the Internet performs the acts described with reference to FIG. 1. The server 94 has a database 96 of computer-readable data indicating groups of members, online/off-line status of members, member-initiated telephone notification options, user-initiated notification options, member telephone numbers and member computer addresses. The server 94 has a computer-network interface 100 to send and receive messages via the Internet. The server 94 also has a telephone-network interface 102 to dial-out and communicate telephone notification messages. The server 94 may comprise either a computer-readable storage medium having prerecorded audio messages, a speech synthesizer to generate audio messages, or a combination thereof.

For purposes of illustration and example, consider a group of members associated with the first user. The group of members consists of the second user, the third user and the fifth user. TABLE I shows an example situation for this group.

TABLE I

| MEMBER-INITIATED TELEPHONE NOTIFICATION OPTION | STATUS | NOTIFICATION |
|---|---|---|
| USER 2 ENABLED | OFF-LINE | TELEPHONE MESSAGE |
| USER 3 DISABLED | OFF-LINE | NO MESSAGE |
| USER 5 ENABLED | ONLINE | ONLINE MESSAGE |

Prior to the first user going on-line in this example, the second user and the fifth user have enabled their member-initiated telephone notification options, and the third user has disabled her member-initiated telephone notification option. At the time the first user goes online, the second user and the third user are off-line, and the fifth user is online.

Since the second user is off-line and has his telephone notification option enabled, the server 94 places a telephone call to a telephone number of the telephone line 80. After the second user answers the telephone call using the telephone 60, the server 94 sends a telephone message to the second user via the telephone-network interface 102. The telephone message may comprise an audio message stating that the first user is now online. Based on the message, the second user may wish to go online using his computer 56 to chat with the first user.

Since the third user is off-line and has her telephone notification option disabled, the server 94 inhibits placing a telephone call to the second telephone line 84.

Since the fifth user is online, the server 94 sends an online message to the fifth user via the computer-network interface 100. The online message is received via the digital subscriber line 92 and displayed by the computer 72. The online message may comprise a textual message stating that the first user is now online. Thereafter, the fifth user may use the computer 72 to chat with the first user.

Optionally, the server 94 may either provide or communicate with an interactive voice response (IVR) unit. Each member may place a telephone call to the IVR and enter his/her password to access his/her notification account. Thereafter, a member may modify his/her telephone notification option, telephone notification limit, buddy list subset, and/or other options.

The IVR may have a storage device which stores the notifications either in addition to or in place of the notification telephone calls. The option to store the notifications in the storage device may be member-selectable. The IVR accesses the storage device and provides a message indicating, within the telephone call, which members of the buddy list are on-line. Preferably, the message includes an audio message comprising either a pre-recorded spoken message, a synthesized speech message, or a combination thereof.

Thus, there has been described herein several embodiments including preferred embodiments of a method, system and article for telephone notification of an online status of a user.

It will be apparent to those skilled in the art that the disclosed invention may be modified in numerous ways and may assume many embodiments other than the preferred form specifically set out and described above.

Accordingly, it is intended by the appended claims to cover all modifications of the invention which fall within the true spirit and scope of the invention.

What is claimed is:

1. A method comprising:
   detecting an online status of a user;
   determining that a first member of a group associated with the user is off-line;
   determine that a notification call limit has not been met or exceeded in a predetermined time interval, wherein the notification call limit comprises a predetermined number of telephone calls to the first member;
   placing a telephone call to a first telephone number associated with the first member based on said determining that the first member is offline; and
   sending a message within the telephone call, the message indicating the online status of the user.

2. The method of claim 1 further comprising:
   determining that a second member of the group associated with the user is off-line; and
   determining that a second-member-initiated telephone notification option is disabled.

3. The method of claim 2 further comprising:
   inhibiting placing a telephone call to a second telephone number associated with the second member.

4. The method of claim 1 further comprising:
   determining that a user-initiated notification option is enabled.

5. The method of claim 1 wherein the message comprises an audio message.

6. The method of claim 1, further comprising the step of determining that the user is a member of a buddy list call subset, wherein the buddy list call subset is a subset of a first-member-initiated buddy list and includes at least one member of the first-member-initiated buddy list.

7. The method of claim 1, further comprising the step of placing a second telephone call to a second telephone number associated with an interactive voice response unit.

8. The method of claim 7, further comprising the steps of:
   in the second telephone call, accessing a first-member-initiated notification account; and
   in the second telephone call, modifying at least one of a first-member-initiated telephone notification option, a buddy list call subset, or a notification call limit.

9. The method of claim 1 further comprising:
   determining that a first-member-initiated telephone notification option is enabled.

10. A method comprising:
    detecting an online status of a user;
    determining that a user-initiated notification option is enabled;
    determining that a first member of a group associated with the user is off-line;
    determining that a first-member-initiated telephone notification option is enabled;
    determine that a notification call limit has not been met or exceeded in a predetermined time interval, wherein the notification call limit comprises a predetermined number of telephone calls to the first member;
    placing a telephone call to a first telephone number associated with the first member;
    sending an audio message within the telephone call, the audio message indicating the online status of the user;
    determining that a second member of the group associated with the user is off-line;
    determining that a second-member-initiated telephone notification option is disabled; and
    inhibiting placing a telephone call to a second telephone number associated with the second member.

11. The method of claim 10, further comprising the steps of:
    placing a second-member-initiated telephone call to a third telephone number, associated with an interactive voice response unit;
    within the second-member-initiated telephone call, providing a message indicating the online status of the user.

12. A computer-readable medium whose contents direct a computer to:
    detect an online status of a user;
    determine that a first member of a group associated with the user is off-line;
    determine that a notification call limit has not been met or exceeded in a predetermined time interval wherein the notification call limit comprises a predetermined number of telephone calls to the first member;
    place a telephone call to a first telephone number associated with the first member; and
    send a message within the telephone call, the message indicating the online status of the user.

13. The computer-readable medium of claim 12 wherein the contents further direct the computer to:
    determine that a second member of the group associated with the user is off-line; and
    determine that a second-member-initiated telephone notification option is disabled.

14. The computer-readable medium of claim 13 wherein the contents further direct the computer to inhibit placing a telephone call to a second telephone number associated with the second member.

15. The computer-readable medium of claim 12 wherein the contents further direct the computer to determine that a user-initiated notification option is enabled.

16. The computer-readable medium of claim 12 wherein the message comprises an audio message.

17. The computer-readable medium of claim 12 wherein the contents further direct the computer to determine that a first-member-initiated telephone notification option is enabled.

18. A server comprising means to detect an online status of a user means, to determine that a first member of a group associated with the user is off-line, means to determine that a notification call limit has not been met or exceeded in a predetermined time interval, wherein the notification call limit comprises a predetermined number of telephone calls to the first member, means to place a telephone call to a first telephone number associated with the first member and means to send a message within the telephone call, the message indicating the online status of the user.

19. The server of claim 18 further operative to determine that a second member of the group associated with the user is off-line, and to determine that a second-member-initiated telephone notification option is disabled.

20. The server of claim 19 further operative to inhibit placing a telephone call to a second telephone number associated with the second member.

21. The server of claim 18 further operative to determine that a user-initiated notification option is enabled.

22. The server of claim 18 wherein the message comprises an audio message.

23. The server of claim 18 further operative to determine that a first-member-initiated telephone notification option is enabled.

* * * * *